United States Patent
Dong

(10) Patent No.: US 12,507,311 B2
(45) Date of Patent: Dec. 23, 2025

(54) DATA TRANSMISSION METHOD AND APPARATUS, TERMINAL, NETWORK DEVICE AND MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 399 days.

(21) Appl. No.: 18/029,090

(22) PCT Filed: Sep. 29, 2020

(86) PCT No.: PCT/CN2020/118952
§ 371 (c)(1),
(2) Date: Mar. 28, 2023

(87) PCT Pub. No.: WO2022/067535
PCT Pub. Date: Apr. 7, 2022

(65) Prior Publication Data
US 2023/0379971 A1    Nov. 23, 2023

(51) Int. Cl.
*H04W 74/0833* (2024.01)
*H04W 74/0836* (2024.01)
*H04W 76/27* (2018.01)

(52) U.S. Cl.
CPC ....... *H04W 76/27* (2018.02); *H04W 74/0833* (2013.01); *H04W 74/0836* (2024.01)

(58) Field of Classification Search
CPC ......... H04W 74/0833; H04W 74/0836; H04W 76/27
See application file for complete search history.

(56) References Cited

U.S. PATENT DOCUMENTS

| | | | |
|---|---|---|---|
| 2020/0100297 A1* | 3/2020 | Agiwal | H04W 52/365 |
| 2020/0236717 A1 | 7/2020 | Sun et al. | |
| 2021/0168895 A1* | 6/2021 | Sha | H04W 52/0235 |
| 2022/0086732 A1* | 3/2022 | Chandrashekar | H04W 72/27 |

(Continued)

FOREIGN PATENT DOCUMENTS

| | | |
|---|---|---|
| CA | 3112923 A1 | 3/2020 |
| CA | 3066439 A1 | 7/2020 |
| CN | 104995852 A | 10/2015 |

(Continued)

OTHER PUBLICATIONS

International Search Report of PCT/CN2020/118952 dated Jun. 24, 2021 with English translation, (4p).

(Continued)

*Primary Examiner* — Liem H. Nguyen
(74) *Attorney, Agent, or Firm* — Arch & Lake LLP; Hao Tan; Shen Wang

(57) ABSTRACT

Data transmission methods, a terminal, a network device and a non-transitory computer-readable storage medium thereof are provided. In a data transmission method, the terminal in a radio resource control (RRC) inactive state sends small data via a random access procedure, where the random access procedure is one of a two-step random access procedure or a four-step random access procedure, and the random access procedure is determined based on data volume of the small data.

14 Claims, 6 Drawing Sheets

(56) References Cited

U.S. PATENT DOCUMENTS

2023/0217305 A1* 7/2023 Zhang ................. H04W 28/06
                                                                 370/230
2023/0300889 A1* 9/2023 Zheng ............... H04W 74/0833
                                                                 370/329

FOREIGN PATENT DOCUMENTS

| CN | 110063068 A | 7/2019 |  |
|---|---|---|---|
| CN | 110139386 A | 8/2019 |  |
| CN | 110913499 A | 3/2020 |  |
| CN | 111246590 A | 6/2020 |  |
| CN | 111263464 A | 6/2020 |  |
| CN | 111328151 A | 6/2020 |  |
| GB | 202004520 A | 5/2020 |  |
| WO | 2020076953 A1 | 4/2020 |  |
| WO | 2020150546 A1 | 7/2020 |  |
| WO | 2020168285 A1 | 8/2020 |  |
| WO | WO-2021207902 A1 * | 10/2021 | ............. H04L 65/40 |

OTHER PUBLICATIONS

Ericsson, "Open issues for the Random access procedure", GPP TSG-RAN WG2 #100, R2-1713474, Reno, Nevada, USA, Nov. 27-Dec. 1, 2017, (11p).

CNOA issued in Application No. 202080002623.6 dated Dec. 20, 2024 with English translation, (20p).

Second Office Action issued to Chinese Application No. 202080002623.6 dated Apr. 17, 2025, (18p).

Notice of Allowance issued to Chinese Application No. 202080002623.6 dated Jun. 13, 2025, (11p).

ZTE, Summary of 7.2.1.2 Procedure for Two-step RACH, Discussion and decision; 3GPP TSG RAN WG1 #96, R1-1903436, Athens, Greece, Feb. 25 to Mar. 1, 2019, (12p).

Interdigital, Session Chair "Report for Rel-16 (NR-U, Power Savings and 2-step RACH) and IIoT and Small Data," 3GPP TSG-RAN WG2 Meeting #111-e, R2-2008124, Electronic, Aug. 17-28, 2020, (20p).

Xia Shen, et al., "5G Random Access Technology Enhancements", China Academy of Information and Communications Technology, Beijing, doi: 10.3969/j.issn. 1006-1010.2020-04-02, (5p).

* cited by examiner

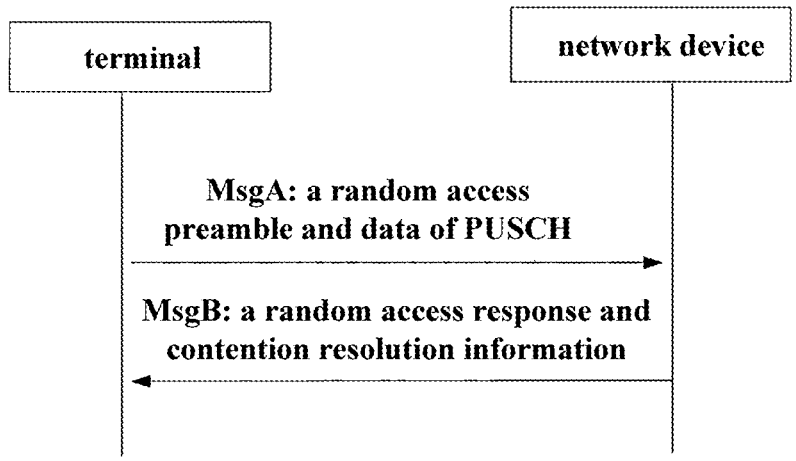

Sending small data via a random access procedure, the random access procedure is one of a two-step random access procedure and a four-step random access procedure, and the random access procedure is determined based on data volume of the small data.    101

Receiving small data sent via a random access procedure, the random access procedure is one of a two-step random access procedure and a four-step random access procedure, the random access procedure is determined based on data volume of the small data, and the small data is sent by a terminal in a radio resource control (RRC) inactive state.    201

FIG. 5

DATA TRANSMISSION METHOD AND APPARATUS, TERMINAL, NETWORK DEVICE AND MEDIUM

CROSS-REFERENCE

The present application is the U.S. National Stage of International Application No. PCT/CN2020/118952, filed on Sep. 29, 2020, the contents of which are incorporated herein by reference in their entireties for all purposes.

BACKGROUND

In the NR (New Radio) system, a terminal can be in one of three RRC states, i.e., an RRC_IDLE (Radio Resource Control_IDLE) state, an RRC_CONNECTED state and an RRC_INACTIVE state.

In related technologies, the terminal needs to be converted from the RRC_INACTIVE state to the RRC_CONNECTED state via a random access procedure before a data transmission. Affected by this state conversion process, the data transmission of the terminal has a large delay.

SUMMARY

The present disclosure relates to the field of communication technology, in particular to a data transmission method and apparatus, terminal, network device and medium. Embodiments of the present disclosure provide a data transmission method and apparatus, terminal, network device and medium. The technical schemes are as follows.

According to a first aspect of the present disclosure, a data transmission method is provided, the method is applied to a terminal in a radio resource control (RRC) inactive state, and the method includes: sending small data via a random access procedure, wherein the random access procedure is one procedure of a two-step random access procedure or a four-step random access procedure, and the random access procedure is determined based on data volume of the small data.

According to a second aspect of the present disclosure, a data transmission method is provided, and the method includes:
  receiving small data sent via a random access procedure, where the random access procedure is one procedure of a two-step random access procedure or a four-step random access procedure, the random access procedure is determined based on data volume of the small data, and the small data is sent by a terminal in a radio resource control (RRC) inactive state.

According to a third aspect of the present disclosure, a terminal is provided, and the terminal includes one or more processor, a non-transitory storage coupled to the one or more processors, and a plurality of programs stored in the non-transitory storage that, when executed by the one or more processors, cause the terminal in a radio resource control (RRC) inactive state to perform the method according to the first aspect.

According to a fourth aspect of the present disclosure, a network device is provided, and the network device includes one or more processors and a non-transitory storage, configured to store executable instructions executable by the one or more processors.

Furthermore, the one or more processors are configured to load and execute the executable instructions to implement the data transmission method according to the second aspect.

According to a fifth aspect of the present disclosure, a non-transitory computer-readable storage medium is provided, wherein instructions in the non-transitory computer-readable storage medium, when executed by a processor, is capable of implementing the data transmission method described in the aforementioned aspects.

It should be understood that the above general description and the following detailed description are only examples and explanatory, and do not limit the present disclosure.

BRIEF DESCRIPTION OF THE DRAWINGS

The drawings herein are incorporated into the specification and form a part of the specification, showing embodiments in conformity with the present disclosure, and are used together with the specification to explain the principles of the present disclosure.

FIG. 3 is a flowchart of a contention-based two-step random access procedure.

FIG. 4 is a flowchart of a data transmission method illustrated according to an embodiment.

FIG. 5 is a flowchart of a data transmission method illustrated according to an embodiment.

DETAILED DESCRIPTION

Figure 1:
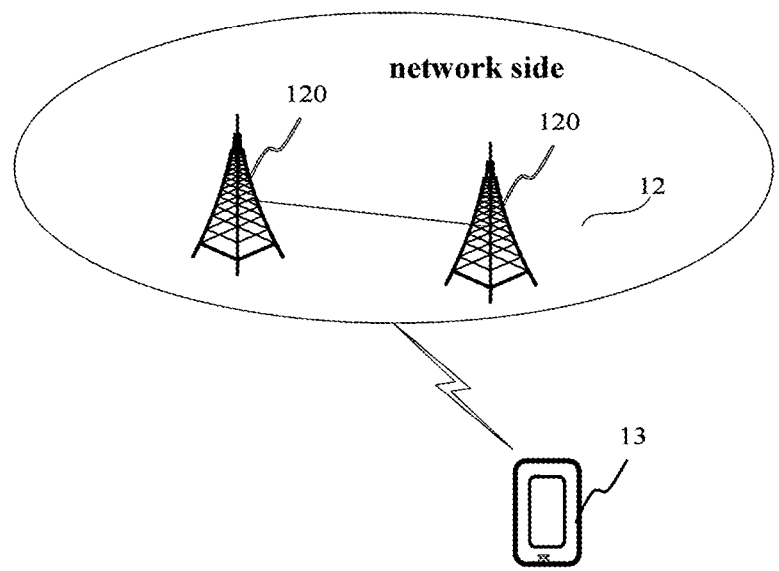
FIG. 1 is a block diagram of a communication system illustrated according to an embodiment.

Embodiments will be described herein in detail, examples of which are represented in the drawings. Where the following description relates to the drawings, the same numerals in different drawings indicate the same or similar elements unless otherwise indicated. The embodiments described in the following embodiments do not represent all embodiments consistent with the present disclosure. Rather, they are only examples of apparatus and methods consistent with some aspects of the present disclosure, as detailed in the appended claims.

The terms used in the embodiments of the present disclosure are only for the purpose of describing specific embodiments, and are not intended to limit the embodiments of the present disclosure. The "a" and "the" in the singular form used in the embodiments of the present disclosure and the appended claims are also intended to include a plurality of forms, unless the context clearly indicates other meanings. It should also be understood that the term "and/or" used herein refers to and includes any or all possible combinations of one or more associated listed items.

It should be understood that although the terms of first, second, third and the like may be used to describe various information in the embodiments of the present disclosure, such information should not be limited to these terms. These terms are only used to distinguish the information of the same type from each other. For example, without departing from the scope of the embodiments of the present disclosure, the first information may also be called the second information, similarly, the second information may also be called the first information. Depending on the context, the words "if" and "in case of" used herein may be interpreted as "when" or "at the time of" or "in response to determination of."

It should be understood that although the steps are described in the way of numbering for the convenience of understanding in the embodiments of the present disclosure, the numbering does not represent the order in which the steps are performed, nor does it mean that the sequentially numbered steps must be performed together. It should be understood that one or more of the sequentially numbered steps may be performed individually to solve the corresponding technical problem and reach the predetermined technical schemes. Even the plurality of steps that are listed together in the drawings for example do not mean that these steps must be performed together. The drawings are just illustrative listing of these steps for ease of understanding.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

The embodiments of the present disclosure are mainly about sending small data via a random access procedure. In the embodiments of the present disclosure, the small data refers to data with data volume not exceeding a set value. For example, the set value is specified by the protocol, such as 240 bits and the like.

FIG. 1 shows a block diagram of a communication system provided by an embodiment of the present disclosure. As shown in FIG. 1, the communication system may include a network side 12 and a terminal 13.

The network side 12 includes a number of network devices 120. The network device 120 may be a base station, and the base station is a device deployed in an access network to provide wireless communication functions for a terminal. The base station may be either a base station of a service cell of the terminal 13 or a base station of a cell adjacent to the service cell of the terminal 13. The base station may include various forms of macro base stations, micro base stations, relay stations, access points, transmission reception points (TRPs), and the like. In systems using different radio access technologies, the names of the devices with the base station function may vary. In 5G NR (New Radio) systems, the name of the devices with the base station function is called gNodeB or gNB. The name "base station" may change as communication technologies evolve. The network device 120 may also be a location management function (LMF) entity.

The terminal 13 may include various devices with wireless communication functions, such as handheld devices, vehicle-mounted devices, wearable devices, computing devices or other processing devices connected to wireless modems, as well as various forms of user devices, mobile stations (MS), terminals, internet of things (IoT), industry internet of things (IIoT), and so on. For the convenience of description, the above-mentioned devices are collectively referred to as terminals. The network device 120 and the terminal 13 communicate with each other through some air interface technology, such as a Uu interface.

The communication system and business scenarios described in the embodiments of the present disclosure are intended to illustrate the technical schemes of the embodiments of this disclosure more clearly and do not constitute a limitation of the technical schemes provided by the embodiments of the present disclosure. It is known to those skilled in the art that the technical schemes provided by the embodiments of the present disclosure are equally applicable to similar technical problems as the communication system evolves and new business scenarios emerge.

To facilitate understanding of the embodiments of the present disclosure, a four-step random access procedure and a two-step random access procedure of the NR system are first described below.

Figure 2:
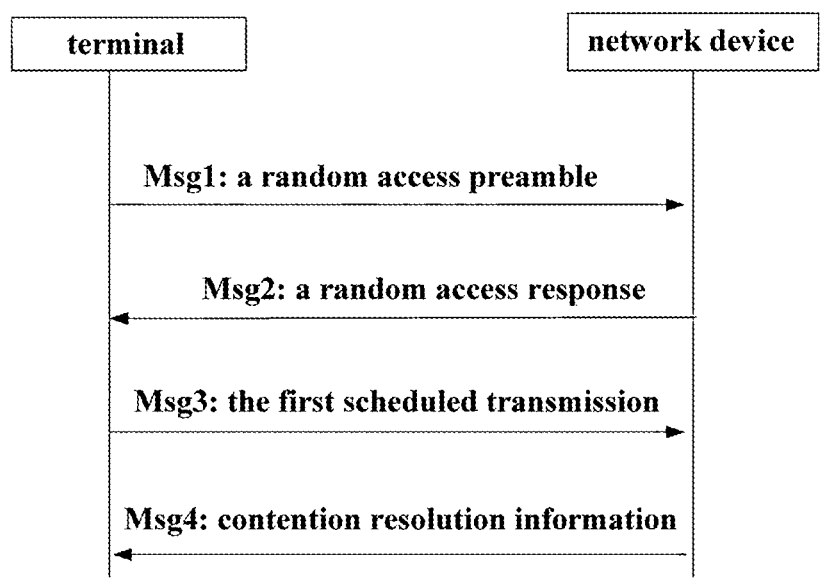
FIG. 2 is a flowchart of a contention-based four-step random access procedure.

When a contention-based random access procedure is completed in four steps, each step is a message (Msg). In the standard, these four steps are called Msg1-Msg4. FIG. 2 is a flowchart of a contention-based four-step random access procedure. As shown in FIG. 2, the four-step random access procedure includes the following steps.

In the step 1, a terminal sends a Msg1 to a network device. The Msg1 includes a random access preamble.

The total number of the random access preambles available in each cell is 64. Two subsets of these 64 random access preambles are defined, and the set of the random access preambles for each subset is communicated to the terminal as part of system information. When performing contention-based random access, the terminal may select any one of random access preamble from these two subsets and send selected the random access preamble on physical random access channel (PRACH) resource (i.e., time-frequency resource).

The random access preamble available for contention-based random access and the PRACH resource for sending the random access preamble are configured by the network device and the configuration results are notified to the terminal in the cell via a system message.

In the step 2, the network device sends a Msg2 to the terminal. The Msg2 includes a random access response (RAR).

A Msg2 may contain a plurality of identities (i.e., index values) of preambles sent by different terminals and may respond to random access requests from the plurality of terminals at the same time. The terminal determines whether a random access response has been received by detecting whether the Msg2 carries the identity of the preamble sent by the terminal.

The network device uses the physical downlink control channel (PDCCH) to schedule the Msg2 and addresses (also called scrambling) through a random access radio network temporary identification (RA-RNTI, Random Access-Radio). The RA-RNTI is determined by the location of the time-frequency resource of the PRACH carrying the Msg1.

The Msg2 may include the identity of the random access of preamble corresponding to the Msg1, the uplink transmission timing advance, the uplink resource allocated for the terminal, the temporary C-RNTI and other parameters.

In the step 3, the terminal sends a Msg3 to the network device.

After receiving the Msg2 correctly, the terminal transmits the Msg3 in the uplink resource allocated in the Msg2 to complete the first scheduled transmission.

The Msg3 may include the identity information of the terminal. For example, a C-RNTI identity or a temporary C-RNTI identity.

In the step 4, the network device sends a Msg4 to the terminal.

The network device and the terminal complete the final contention resolution through the Msg4. The content of the Msg4 corresponds to the content of the Msg3.

If the terminal is not allocated with a C-RNTI, the network device will use a PDCCH scrambled by a temporary C-RNTI to schedule the Msg4. The terminal uses the temporary C-RNTI to address on the PDCCH to get the location of the time-frequency resource of the Msg4. After a successful addressing, the Msg4 is obtained from the location of the time-frequency resource. The Msg4 carries a contention resolution identity (CRI) through the media access control address (MAC) layer control element (CE). After receiving the MAC CE, the terminal compares the MAC CE with the identity information sent in the Msg3, and if the two are the same, a successful contention resolution is determined, and the terminal determines that the random access is completed.

If the terminal is allocated with a C-RNTI, the network device will use a PDCCH scrambled by the C-RNTI to schedule the Msg4. The terminal uses the C-RNTI to address on the PDCCH. A successful addressing indicates a successful contention resolution, and the terminal determines that the random access is completed.

FIG. 3 is a flowchart of a contention-based two-step random access procedure. As shown in FIG. 3, the two-step random access procedure includes the following steps:

In the step 1, a terminal sends a MsgA to a network device, and the network device receives the MsgA.

The MsgA includes a random access preamble and data of physical uplink shared channel (PUSCH). The data of the PUSCH may contain identity information of the terminal, such as a C-RNTI, etc. That is, the MsgA includes content of the Msg1 and content of the Msg3.

In the step 2, the network device sends a MsgB to the terminal, and the terminal receives the MsgB.

The MsgB includes a random access response and contention resolution information. That is, the MsgB includes content of the Msg2 and content of the Msg4. Herein, the random access response includes the identity of the random access preamble, and the contention resolution information may include the identity of contention resolution.

In the embodiments of the present disclosure, the terminal supports both a two-step random access procedure and a four-step random access procedure.

FIG. 4 is a flowchart of a data transmission method illustrated according to an embodiment. The method may be executed by the terminal, as shown in FIG. 4, the method includes the following steps:

In the step 101, small data is sent via a random access procedure, the random access procedure is one of a two-step random access procedure and a four-step random access procedure, and the random access procedure is determined based on data volume of the small data.

It should be noted that when the terminal sends the small data via the random access procedure, the terminal is in RRC_INACTIVE.

In the embodiments of the present disclosure, when a terminal in an RRC_INACTIVE state is to send small data, a random access procedure is determined from a two-step random access procedure and a four-step random access procedure based on data volume of the small data to send the small data, and by selecting a suitable random access procedure, small data transmission during the conversion of the terminal from the RRC_INACTIVE state to the RRC_CONNECTED state is realized without waiting for the completion of the state conversion before the small data transmission, making it possible to transmit the small data in a timely manner and reducing the time delay.

Alternatively, the sending the small data via the random access procedure includes:

in response to determination of a random access channel occasion (RO) configured by a network device including a first RO, sending the small data via the two-step random access procedure, herein, resource in a physical uplink shared channel occasion (PO) associated with the first RO is sufficient to carry the small data.

Alternatively, the sending the small data via the random access procedure includes:

in response to determination of the data volume being less than or equal to a data volume threshold and a random access channel occasion (RO) configured by a network device including a first RO, sending the small data via the two-step random access procedure.

Alternatively, the sending the small data via the random access procedure includes:

in response to determination of a random access channel occasion (RO) configured by a network device including a second RO, sending the small data via the two-step random access procedure, herein, the second RO is a RO configured by the network device to exclusively send the small data.

Alternatively, the sending the small data via the two-step random access procedure includes:

sending the small data by using the PO associated with the first RO.

Alternatively, the sending the small data via the random access procedure includes: in response to determination of a random access channel occasion (RO) configured by a network device not including a first RO, sending the small data via the four-step random access procedure, herein, resource in a PO associated with the first RO is sufficient to carry the small data.

Alternatively, the sending the small data via the random access procedure includes:

in response to determination of a RO configured by a network device not including a first RO but including a second RO, sending the small data via the two-step random access procedure. Resource in a PO associated with the first RO is sufficient to carry the small data, and the second RO is a RO configured by the network device to exclusively send the small data.

Alternatively, the sending the small data via the random access procedure includes:

in response to determination of a RO configured by a network device not including a first RO or a second RO, sending the small data via the four-step random access procedure, resource in a PO associated with the first RO is sufficient to carry the small data, and the second RO is a RO configured by the network device to exclusively send the small data.

Alternatively, the sending the small data via the random access procedure includes:

in response to determination of the data volume being greater than a data volume threshold, sending the small data via the four-step random access procedure.

Alternatively, the sending the small data via the four-step random access procedure includes:

sending a first preamble, herein, the first preamble is used for indicating the small data is to be sent via the four-step random access procedure;

receiving a random access response, herein, the random access response includes indication information of resource for transmitting the small data, and the random access response is sent based on the first preamble;

sending the small data sent in a Msg3 by using the resource indicated by the indication information.

Alternatively, the data volume threshold is configured by a network device.

It is worth noting that the above step 101 and the above alternative steps may be combined in any combination.

FIG. 5 is a flowchart of a data transmission method illustrated according to an embodiment. The method may be performed by a network device, and the method includes the following steps.

In the step 201, small data sent via a random access procedure is received, the random access procedure is one of a two-step random access procedure and a four-step random access procedure, the random access procedure is determined based on data volume of the small data, and the small data is sent by a terminal in an RRC_INACTIVE state.

In the embodiments of the present disclosure, when a terminal in an RRC_INACTIVE state is to send small data, a random access procedure is determined from a two-step random access procedure and a four-step random access procedure based on data volume of the small data to send the small data, and by selecting a suitable random access procedure, small data transmission during the conversion of the terminal from the RRC_INACTIVE state to the RRC_CONNECTED state is realized without waiting for the completion of the state conversion before the small data transmission, making it possible to transmit the small data in a timely manner and reducing the time delay.

Alternatively, the receiving the small data sent via the random access procedure includes: receiving the small data sent in a PO associated with a first RO via the two-step random access procedure, the first RO is one of a plurality of ROs configured by a network device, and resource in the PO associated with the first RO is sufficient to carry the small data.

Alternatively, the receiving the small data sent via the random access procedure includes: receiving the small data sent in a PO associated with a second RO via the two-step random access procedure, the second PO is one of a plurality of ROs configured by a network device, and the second RO is a RO configured by the network side to send the small data.

Alternatively, the receiving the small data sent via the random access procedure includes: receiving the small data sent via the four-step random access procedure, herein, the data volume of the small data is greater than a data volume threshold.

Alternatively, the receiving the small data sent via the random access procedure includes: receiving the small data sent via the four-step random access procedure, herein, resource in a PO associated with any RO configured by a network device is not sufficient to carry the small data.

Alternatively, the receiving the small data sent via the four-step random access procedure includes:

receiving a first preamble, herein, the first preamble is used for indicating the small data is to be sent via the four-step random access procedure;

sending a random access response based on the first preamble, herein, the random access response includes indication information of resource for transmitting the small data;

receiving the small data sent in a Msg3 by using the resource indicated by the indication information.

It is worth noting that the above step 201 and the above alternative steps may be combined in any combination.

Figure 6:
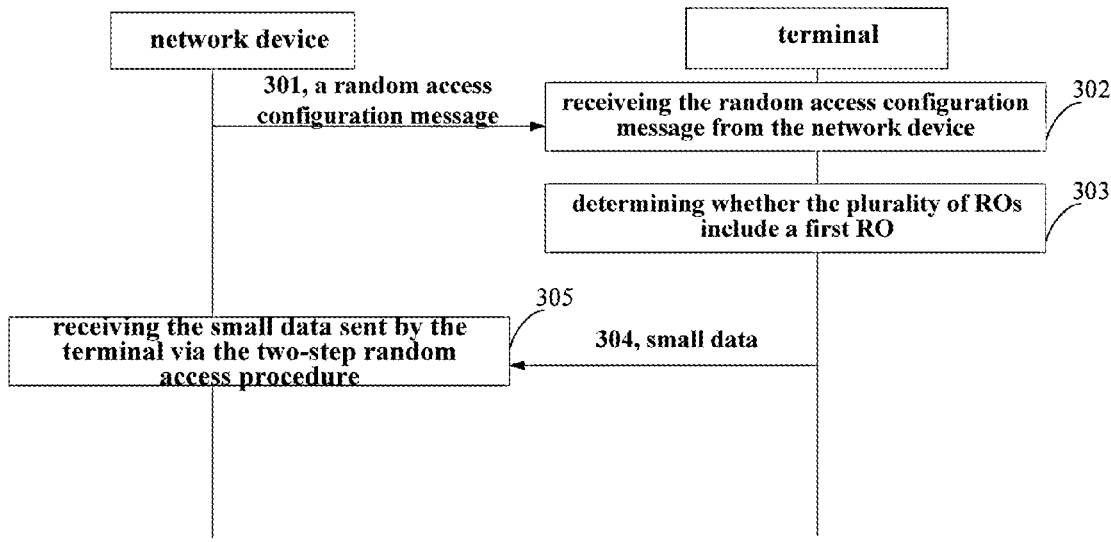
FIG. 6 is a flowchart of a data transmission method illustrated according to an embodiment.

FIG. 6 is a flowchart of a data transmission method illustrated according to an embodiment. The method may be performed jointly by a terminal and a network device. Referring to FIG. 6, the method includes the following steps.

In the step 301, the network device sends a random access configuration message.

The random access configuration message includes indication information of a plurality of ROs. The indication information of the plurality of ROs is used for indicating location of resource of the plurality of ROs. The plurality of ROs include a RO used for a two-step random access procedure and a RO used for a four-step random access procedure.

For ROs used for a two-step random access procedure, each RO is associated with a PO, and the POs associated with different ROs are different. The PO associated with a RO is configured by the network device. Alternatively, the size of resource in the POs associated with different ROs are the same or different.

In the step 302, the terminal receives the random access configuration message from the network device.

In the step 303, the terminal determines whether the plurality of ROs used for the two-step random access procedure include a first RO.

Resource in the PO associated with the first RO is sufficient to carry the small data. In the embodiments of the present disclosure, resource in the PO refers to time-frequency resource.

The step 303 includes: for each RO of the plurality of ROs, the terminal calculates the maximum volume of data that can be carried by the resource of the PO associated with the RO; if this maximum volume of data is greater than or equal to the data volume of the small data to be sent by the terminal, the resource in the PO associated with the RO is sufficient to carry the small data; or, if this maximum volume of data is less than the data volume of the small data to be sent by the terminal, the resource in the PO associated with the RO is not sufficient to carry the small data.

Alternatively, the plurality of ROs include one or more first ROs. When the terminal determines the plurality of ROs include the first RO, step 304 is performed.

In the step 304, the terminal sends the small data via the two-step random access procedure.

In this step 304, the terminal sends the small data by using the PO associated with the first RO. That is, the terminal sends the small data by using the MsgA.

Alternatively, when the plurality of ROs configured by the network device include a multiple of the first ROs, in one possible implementation, the terminal randomly selects a first RO from the plurality of the first ROs, and sends the small data by using the PO associated with the selected first RO. In another possible implementation, the terminal selects from the plurality of the first ROs the first RO with the maximum volume of data of the resource in the associated PO being closest to the data volume of the small data to be sent by the terminal, and sends the small data by using the PO associated with the selected first RO.

Through the step 303 and step 304, the terminal determines the random access procedure for sending the small data based on the data volume of the small data to be transmitted.

In the step 305, the network device receives the small data sent by the terminal via the two-step random access procedure.

Alternatively, in another implementation, the step 303 may be replaced by: the terminal determines whether the plurality of ROs include a second RO, herein, the second RO is a RO configured by the network device to exclusively send the small data. Accordingly, the step 304 may be replaced by: if the terminal determines the plurality of ROs include a second RO, the small data is sent via the two-step random access procedure. In this case, by configuring the terminal with an RO dedicated to transmitting the small data, the network device enables the terminal to send the small data via the two-step random access procedure.

Alternatively, in another implementation, the step 403 may be replaced by: the terminal sequentially determines whether the plurality of ROs include a first RO and a second RO, herein, resource in a PO associated with the first RO is sufficient to carry the small data, and the second RO is a RO configured by the network device to exclusively send the small data. If the terminal determines the plurality of ROs include at least one of the first RO and the second RO, the small data is sent via the two-step random access procedure.

Moreover, the sequence of the terminal determining the first RO and the second RO is not limited by the embodiments of the present disclosure. For example, the terminal first determines whether the second RO is included, and if the terminal determines that the second RO is included, the terminal sends the small data via the two-step random access procedure by using the PO associated with the second RO. If the terminal determines that the second RO is not included, the terminal determines whether the first RO is included, and if the terminal determines that the first RO is included, the terminal sends the small data via the two-step random access procedure by using the PO associated with the first RO.

For another example, the terminal first determines whether the first RO is included, and if the terminal determines that the first RO is included, the terminal sends the small data via the two-step random access procedure by using the PO associated with the first RO. If the terminal determines that the first RO is not included, the terminal determines whether the second RO is included, and if the terminal determines that the second RO is included, the terminal sends the small data via the two-step random access procedure by using the PO associated with the second RO.

Figure 7:
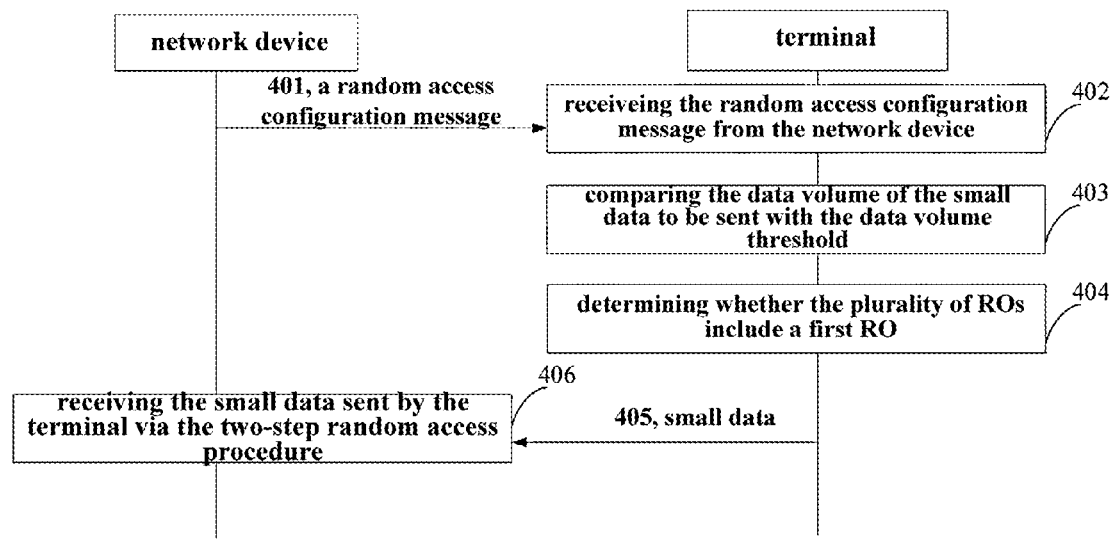
FIG. 7 is a flowchart of a data transmission method illustrated according to an embodiment.

FIG. 7 is a flowchart of a data transmission method illustrated according to an embodiment. The method may be performed jointly by a terminal and a network device. The difference between this method and the method shown in FIG. 6 is that the terminal first compares data volume of small data with a data volume threshold. When the data volume of the small data does not exceed the data volume threshold, whether the plurality of ROs configured by the network device for a two-step random access procedure include a first RO in determined. In this way, when the data volume of the small data is large and the number of ROs is large, the terminal does not need to calculate the maximum volume of data that can be carried by the resource of the PO associated with each RO, simplifying the procedure of the terminal and improving the efficiency of random access.

Referring to FIG. 7, the method includes the following steps.

In the step 401, the network device sends a random access configuration message.

In the step 402, the terminal receives the random access configuration message from the network device.

In the step 403, the terminal compares the data volume of the small data to be sent with the data volume threshold.

If the data volume of the small data does not exceed the data volume threshold, the step 404 is performed.

Alternatively, the data volume threshold is configured for the network device. For example, the data volume threshold is greater than or equal to the maximum value of the maximum volume of data that can be carried by the resource corresponding to the POs associated with all ROs which may be configured by the network device. For example, the data volume threshold is 300 bits, the maximum value is 72 bits, and the data volume threshold is greater than the maximum value.

In this case, the method further includes:
the network device sends the data volume threshold.
the terminal receives the data volume threshold sent by the network device.

For example, the network device sends the data volume threshold via a system information block (SIB).

In the step 404, the terminal determines whether the plurality of ROs include a first RO.

If the terminal determines the plurality of ROs include a first RO, the step 405 is performed.

In the step 405, the terminal sends the small data via the two-step random access procedure.

In the step 406, the network device receives the small data sent by the terminal via the two-step random access procedure.

In the embodiments of the present disclosure, when a terminal in an RRC_INACTIVE state is to send small data, a random access procedure is determined from a two-step random access procedure and a four-step random access procedure based on data volume of the small data to send the small data, and by selecting a suitable random access procedure, small data transmission during the conversion of the terminal from the RRC_INACTIVE state to the RRC_CONNECTED state is realized without waiting for the completion of the state conversion before the small data transmission, making it possible to transmit the small data in a timely manner and reducing the time delay.

In addition, when the terminal is to send the small data, whether resource corresponding to the PO associated with the RO is sufficient to carry the small data is first determined, and if there is resource corresponding to the PO associated with the RO being sufficient to carry the small data, the small data is sent via the two-step random access procedure by using the resource corresponding to the PO, further improving the efficiency of the small data transmission.

Figure 8:
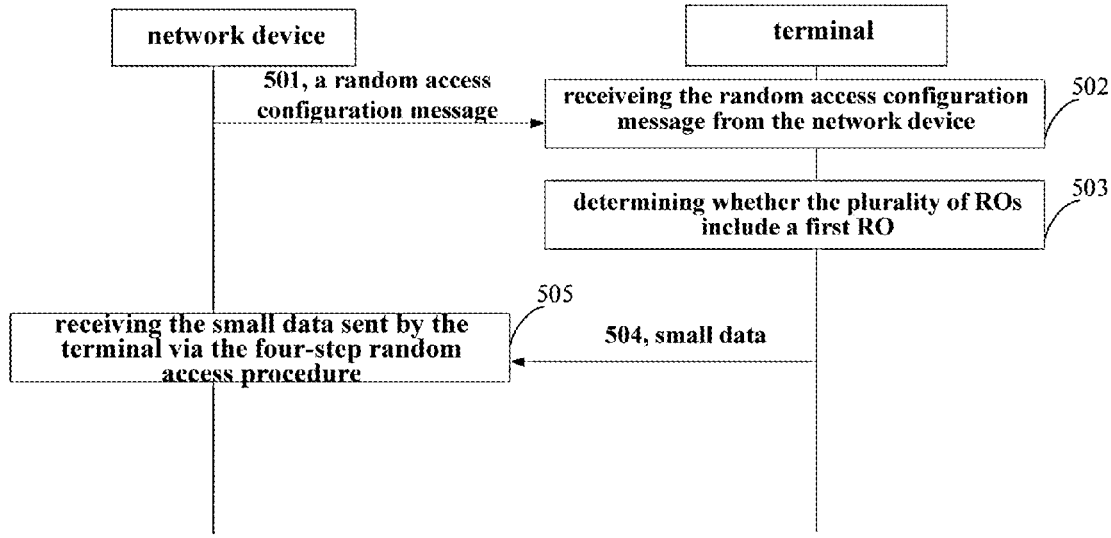
FIG. 8 is a flowchart of a data transmission method illustrated according to an embodiment.

FIG. 8 is a flowchart of a data transmission method illustrated according to an embodiment. The method may be performed jointly by a terminal and a network device. Referring to FIG. 8, the method includes the following steps.

In the step 501, the network device sends a random access configuration message.

Refer to the aforementioned step 301 for the relevant content of the step 501, which will not be repeated here.

In the step 502, the terminal receives the random access configuration message from the network device.

In the step 503, the terminal determines whether the plurality of ROs include a first RO.

Resource in the PO associated with the first RO is sufficient to carry the small data.

If the terminal determines the plurality of ROs do not include a first RO, the step 504 is performed.

Refer to the aforementioned step 303 for the relevant content of the step 503, the detailed description of which will not be repeated here.

In the step 504, the terminal sends the small data via the four-step random access procedure.

In the step 505, the network device receives the small data sent by the terminal via the four-step random access procedure.

Figure 9:
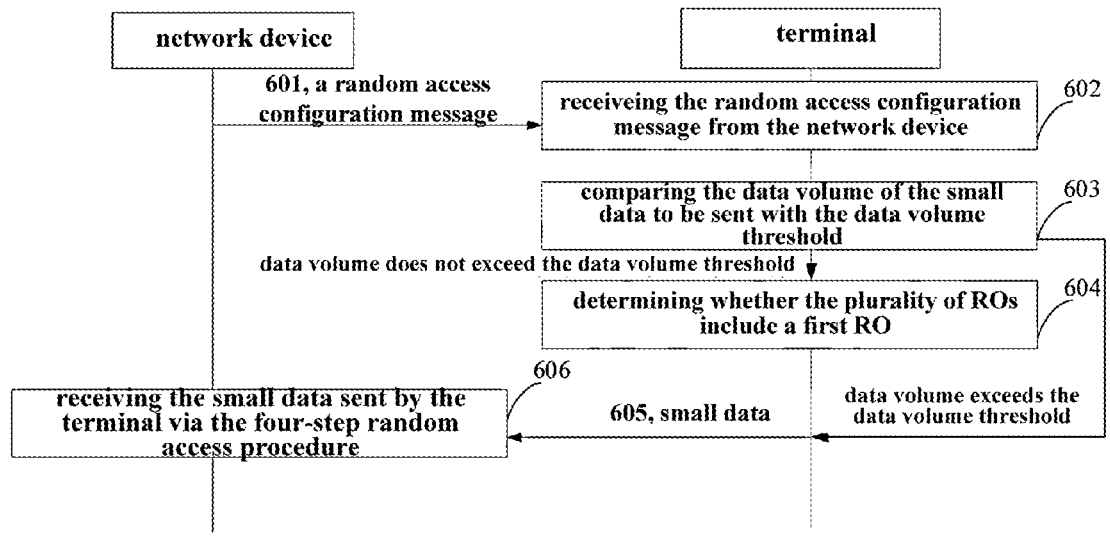
FIG. 9 is a flowchart of a data transmission method illustrated according to an embodiment.

FIG. 9 is a flowchart of a data transmission method illustrated according to an embodiment. The method may be performed jointly by a terminal and a network device. Referring to FIG. 8, the method includes the following steps. The difference between this method and the method shown in FIG. 8 is that the terminal first compares data volume of small data with a data volume threshold. When the data volume of the small data does not exceed the data volume threshold, whether the plurality of ROs configured by the network device for a two-step random access procedure include a first RO in determined. In this way, when the data volume of the small data is large and the number of ROs is large, the terminal does not need to calculate the maximum volume of data that can be carried by the resource of the PO associated with each RO, simplifying the procedure of the terminal and improving the efficiency of random access.

Referring to FIG. 9, the method includes the following steps.

In the step 601, the network device sends a random access configuration message.

In the step 602, the terminal receives the random access configuration message from the network device.

In the step 603, the terminal compares the data volume of the small data to be sent with the data volume threshold.

If the data volume of the small data does not exceed the data volume threshold, the step 604 is performed. If the data volume of the small data exceeds the data volume threshold, the step 605 is performed.

Refer to the aforementioned step 403 for the relevant content of the data volume threshold, the detailed description of which will not be repeated here.

In the step 604, the terminal determines whether the plurality of ROs include a first RO.

Resource in the PO associated with the first RO is sufficient to carry the small data. If the terminal determines the plurality of ROs include a first RO, the small data is sent via the two-step random access procedure.

If the terminal determines the plurality of ROs do not include a first RO, the step 605 is performed.

In the step 605, the terminal sends the small data via the four-step random access procedure.

In the step 606, the network device receives the small data sent by the terminal via the four-step random access procedure.

Figure 10:
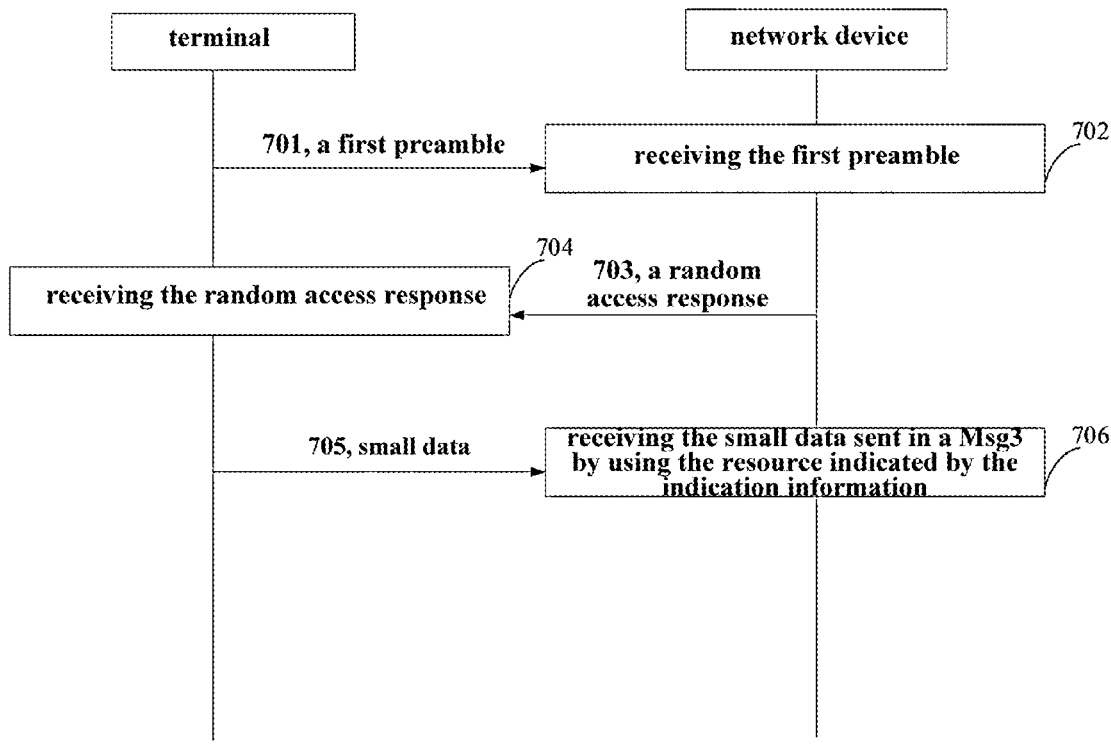
FIG. 10 is a flowchart of a small data transmission process via a four-step random access procedure illustrated according to an embodiment.

FIG. 10 is a flowchart of a small data transmission process via a four-step random access procedure illustrated according to an embodiment. As shown in FIG. 10, sending the small data via the four-step random access procedure includes the following steps.

In the step 701, a terminal sends a first preamble, herein, the first preamble is used for indicating the small data is to be sent via the four-step random access procedure.

In the step 702, a network device receives the first preamble.

Alternatively, the first preamble is determined from the set of the random access preambles.

For example, a plurality of preambles are divided into two sets by the network device. The first set of the preambles include a plurality of first preambles. The first preamble of the first set of the preambles is not only used for indicating the terminal is to perform random access, but also used for indicating the small data is to be sent via the four-step random access procedure. The second set of the preambles include a plurality of second preambles. The second preamble is a common preamble and is only used for indicating the terminal is to perform random access.

In the step 703, the network device sends a random access response based on the first preamble.

Herein, the random access response includes indication information of resource for transmitting the small data, and the random access response is sent based on the first preamble.

Resource allocated by the network device to the terminal based on the first preamble is more than resource allocated by the network device to the terminal based on the second preamble, so that the terminal can get enough resource as much as possible to transmit the small data. For example, the network device allocates more uplink grants (UL grant) to the terminal based on the first preamble.

For example, the number of resource indicated by the indication information is fixed. For example, the maximum volume of data that can be carried by the resource indicated by the indication information is equal to the aforementioned data volume threshold.

In the step 704, the terminal receives the random access response.

In the step 705, the terminal sends the small data in a Msg3 by using the resource indicated by the indication information.

In the step 706, the network device receives the small data sent in the Msg3 by using the resource indicated by the indication information.

Through the steps 701 to 706, the aforementioned steps 504 to 505 may be implemented, or the steps 605 to 606 may be implemented.

In the embodiments of the present disclosure, when a terminal in an RRC_INACTIVE state is to send small data, a random access procedure is determined from a two-step random access procedure and a four-step random access procedure based on data volume of the small data to send the small data, and by selecting a suitable random access procedure, small data transmission during the conversion of the terminal from the RRC_INACTIVE state to the RRC_CONNECTED state is realized without waiting for the completion of the state conversion before the small data transmission, making it possible to transmit the small data in a timely manner and reducing the time delay.

In addition, when the terminal is to send the small data, whether resource corresponding to the PO associated with the RO is sufficient to carry the small data is first determined, and if there is resource corresponding to the PO associated with the RO being not sufficient to carry the small data, the small data is sent via the four-step random access procedure. In the four-step random access procedure, because the resource used by the terminal to transmit data via the four-step random access procedure is allocated by the network device according to the random access request, when the terminal is to send larger small data via the four-step random access procedure, allocating larger resources is sufficient, and there is no need to make major changes to the physical layer protocol, which is easy to implement.

Figure 11:
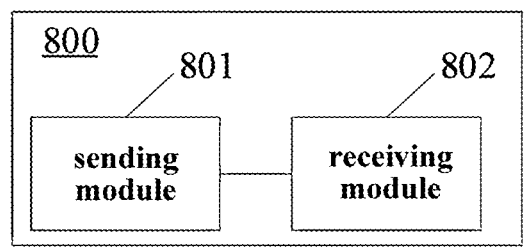
FIG. 11 is a schematic structure diagram of a data transmission apparatus illustrated according to an embodiment.

FIG. 11 is a schematic structure diagram of a data transmission apparatus illustrated according to an embodiment. The apparatus has a function of the terminal to implement the method embodiments described above. The function may be implemented by hardware or by executing corresponding software through hardware. As shown in FIG. 11, the apparatus 800 includes a sending module 801. The sending module 801 is configured to send small data via a random access procedure, the random access procedure is one of a two-step random access procedure and a four-step random access procedure, and the random access procedure is determined based on data volume of the small data. The apparatus 800 is in an RRC_INACTIVE state.

Alternatively, the sending module 801 is configured to in response to determination of a random access channel occasion (RO) configured by a network device including a first RO, send the small data via the two-step random access procedure, herein, resource in a PO associated with the first RO is sufficient to carry the small data.

Alternatively, the sending module 801 is configured to send the small data by using the PO associated with the first RO.

Alternatively, the sending module 801 is configured to in response to determination of a random access channel occasion (RO) configured by a network device not including a first RO, sending the small data via the four-step random access procedure, herein, resource in a PO associated with the first RO is sufficient to carry the small data.

Alternatively, the sending the small data via the random access procedure includes:

in response to determination of the data volume being greater than a data volume threshold, sending the small data via the four-step random access procedure.

Alternatively, the apparatus 800 further includes a receiving module 802. The sending module 801 is configured to send a first preamble, the first preamble is used for indicating the small data is to be sent via the four-step random access procedure. The receiving module 802 is configured to receive a random access response, the random access response includes indication information of resource for transmitting the small data, and the random access response is sent based on the first preamble. The sending module 801 is further configured to send the small data sent in a Msg3 by using the resource indicated by the indication information.

Figure 12:
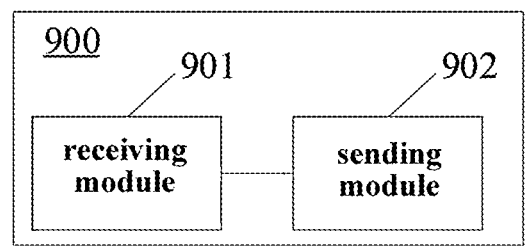
FIG. 12 is a schematic structure diagram of a data transmission apparatus illustrated according to an embodiment.

FIG. 12 is a schematic structure diagram of a data transmission apparatus illustrated according to an embodiment. The apparatus has a function of the network device to implement the method embodiments described above. The function may be implemented by hardware or by executing corresponding software through hardware. As shown in FIG. 12, the apparatus 900 includes a receiving module 901. The receiving module 901 is configured to receive small data sent via a random access procedure, the random access procedure is one of a two-step random access procedure and a four-step random access procedure, the random access procedure is determined based on data volume of the small data, and the small data is sent by a terminal in an RRC_INACTIVE state.

Alternatively, the receiving module 901 is configured to receive the small data sent via the two-step random access procedure by using the PO associated with the first RO. The first RO is one of a plurality of ROs configured by a network device, and resource in the PO associated with the first RO is sufficient to carry the small data.

Alternatively, the receiving module 901 is configured to receive the small data sent via the four-step random access procedure, herein, the data volume of the small data is greater than a data volume threshold, or resource in a PO associated with any RO configured by a network device is not sufficient to carry the small data.

Alternatively, the apparatus further includes a sending module 902. The receiving module 901 is configured to receive a first preamble, the first preamble is used for indicating the small data is to be sent via the four-step random access procedure. The sending module 902 is configured to send a random access response based on the first preamble, the random access response includes indication information of resource for transmitting the small data, and the random access response is sent based on the first preamble. The receiving module 901 is further configured to receive the small data sent in a Msg3 by using the resource indicated by the indication information.

Figure 13:
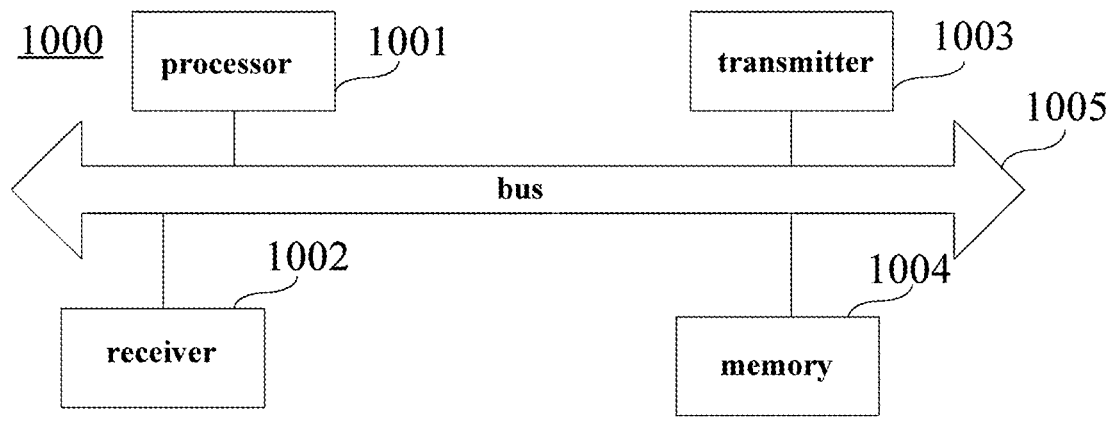
FIG. 13 is a block diagram of a terminal illustrated according to an embodiment.

FIG. 13 is a block diagram of a terminal illustrated according to an embodiment. As shown in FIG. 13, the terminal 1000 may include: a processor 1001, a receiver 1002, a transmitter 1003, a memory 1004 and a bus 1005.

The processor 1001 includes one or more processing cores, and the processor 1001 executes various functional applications as well as information processing by running software programs as well as modules.

The receiver 1002 and the transmitter 1003 may be implemented as a communication component. The communication component may be a communication chip.

The memory 1004 is connected to the processor 1001 via the bus 1005.

The memory 1004 may be configured to store at least one instruction. The processor 1001 is configured to execute the at least one instruction to implement the steps performed by the terminal in the signal transmission method provided in the embodiments of the present disclosure.

In addition, the memory 1004 may be implemented by any type of volatile or non-volatile storage device or a combination of any type of volatile and non-volatile storage device, the volatile or non-volatile storage devices including, but not limited to the following: a disk or optical disk, electrically erasable programmable read-only memory (EEPROM), erasable programmable read-only memory (EPROM), static readily accessible memory (SRAM), read-only memory (ROM), magnetic memory, flash memory, programmable read-only memory (PROM).

In one embodiment, a computer-readable storage medium is also provided. The computer-readable storage medium stores at least one instruction, at least one program, code set or instruction set. The at least one instruction, at least one program, code set or instruction set is loaded and executed by a processor to implement the steps performed by the terminal in the data transmission method provided by the above various method embodiments.

Figure 14:
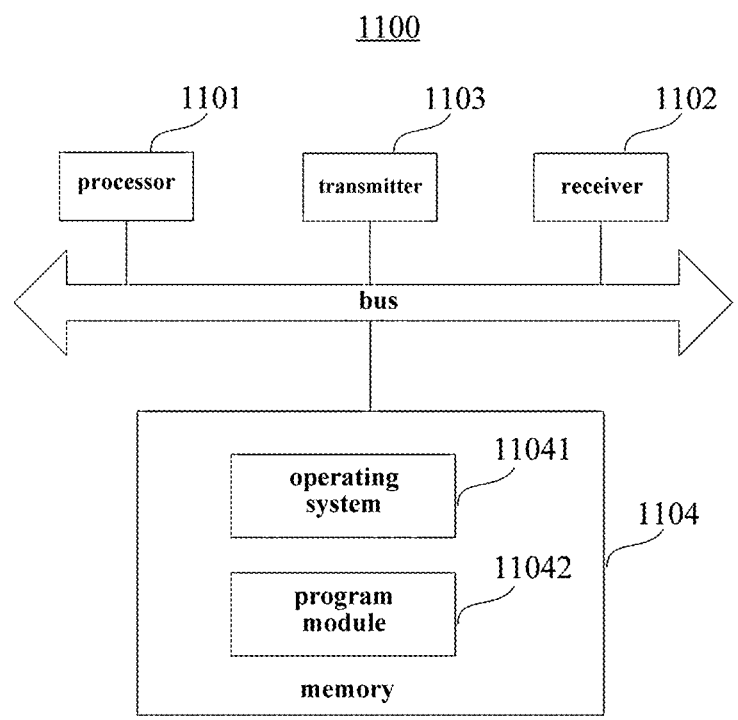
FIG. 14 is a block diagram of a network device illustrated according to an embodiment.

FIG. 14 is a block diagram of a network device 1100 illustrated according to an embodiment. As shown in FIG. 14, the network device 1100 may include: a processor 1101, a receiver 1102, a transmitter 1103 and a memory 1104. The receiver 1102, the transmitter 1103, and the memory 1104 are each connected to the processor 1101 via a bus.

The processor 1101 includes one or more processing cores, and the processor 1101 executes, by running software programs as well as modules, the method performed by the network device in the signal transmission method provided by the embodiments of the present disclosure. The memory 1104 may be used to store software programs as well as modules. Specifically, the memory 1104 may store an operating system 11041 and an application program module 11042 required for at least one function. The receiver 1102 is used to receive communication data sent by other devices. The transmitter 1103 is used to send the communication data to other devices.

In one embodiment, a computer-readable storage medium is also provided. The computer-readable storage medium stores at least one instruction, at least one program, code set or instruction set. The at least one instruction, at least one program, code set or instruction set is loaded and executed by a processor to implement the steps performed by the network device in the data transmission method provided by the above various method embodiments.

One embodiment of the present disclosure also provides a communication system. The communication system includes a terminal and a network device. The terminal is a terminal as provided in the embodiment shown in FIG. 13. The network device is a network device as provided in the embodiment shown in FIG. 14.

According to one embodiment of the present disclosure, a data transmission method is provided, the method is applied to a terminal in a radio resource control (RRC) inactive state, and the method includes: sending small data via a random access procedure, where the random access procedure is one of a two-step random access procedure and a four-step random access procedure, and the random access procedure is determined based on data volume of the small data.

In one embodiment, the sending the small data via the random access procedure includes:
  in response to determination of a random access channel occasion (RACH occasion, RO) configured by a network device including a first RO, sending the small data via the two-step random access procedure, wherein resource in a physical uplink shared channel occasion (PUSCH occasion, PO) associated with the first RO is sufficient to carry the small data.

In another embodiment, the sending the small data via the random access procedure includes:
  in response to determination of a random access channel occasion (RO) configured by a network device including a second RO, sending the small data via the two-step random access procedure, wherein the second RO is a RO configured by the network device to exclusively send the small data.

In another embodiment, the sending the small data via the random access procedure includes:
  in response to determination of the data volume being less than or equal to a data volume threshold and a random access channel occasion (RO) configured by a network device including a first RO, sending the small data via the two-step random access procedure.

Alternatively, the sending the small data via the two-step random access procedure includes:
  sending the small data by using the PO associated with the first RO.

In another embodiment, the sending the small data via the random access procedure includes: in response to determination of a random access channel occasion (RO) configured by a network device not including a first RO, sending the small data via the four-step random access procedure, wherein resource in a PO associated with the first RO is sufficient to carry the small data.

In another embodiment, the sending the small data via the random access procedure includes:
  in response to determination of a RO configured by a network device not including a first RO or a second RO, sending the small data via the four-step random access procedure, wherein resource in a physical uplink shared channel occasion (PO) associated with the first RO is sufficient to carry the small data, and the second RO is a RO configured by the network device to exclusively send the small data.

In yet another embodiment, the sending the small data via the random access procedure includes:
  in response to determination of the data volume being greater than a data volume threshold, sending the small data via the four-step random access procedure.

Alternatively, the sending the small data via the four-step random access procedure includes:
  sending a first preamble, wherein the first preamble is used for indicating the small data is to be sent via the four-step random access procedure;
  receiving a random access response, wherein the random access response includes indication information of resource for transmitting the small data, and the random access response is sent based on the first preamble;
  sending the small data sent in a Msg3 by using the resource indicated by the indication information.

Alternatively, the data volume threshold is configured by a network device.

According to another embodiment of the present disclosure, a data transmission method is provided, and the method includes:
  receiving small data sent via a random access procedure, wherein the random access procedure is one of a two-step random access procedure and a four-step random access procedure, the random access procedure is determined based on data volume of the small data, and the small data is sent by a terminal in a radio resource control (RRC) inactive state.

In one embodiment, the receiving the small data sent via the random access procedure includes: receiving the small data sent in a PO associated with a first RO via the two-step random access procedure, wherein the first PO is one of a plurality of ROs configured by a network device, and resource in the physical uplink shared channel occasion (PO) associated with the first RO is sufficient to carry the small data.

In another embodiment, the receiving the small data sent via the random access procedure includes: receiving the small data sent in a PO associated with a second RO via the two-step random access procedure, wherein the second RO is one of a plurality of ROs configured by a network device, and the second RO is a RO configured by the network side to send the small data.

In yet another embodiment, the receiving the small data sent via the random access procedure includes: receiving the small data sent via the four-step random access procedure, wherein the data volume of the small data is greater than a data volume threshold.

In yet another embodiment, the receiving the small data sent via the random access procedure includes: receiving the small data sent via the four-step random access procedure, wherein resource in a physical uplink shared channel occasion (PO) associated with any RO configured by a network device is not sufficient to carry the small data.

Alternatively, the receiving the small data sent via the four-step random access procedure includes:

receiving a first preamble, wherein the first preamble is used for indicating the small data is to be sent via the four-step random access procedure;

sending a random access response based on the first preamble, wherein the random access response includes indication information of resource for transmitting the small data;

receiving the small data sent in a Msg3 by using the resource indicated by the indication information.

According to one embodiment of the present disclosure, a data transmission apparatus is provided, and the apparatus includes:

a sending module, configured to send small data via a random access procedure, wherein the random access procedure is one of a two-step random access procedure and a four-step random access procedure, and the random access procedure is determined based on data volume of the small data.

According to one embodiment of the present disclosure, a data transmission apparatus is provided, and the apparatus includes:

a receiving module, configured to receive small data sent via a random access procedure, wherein the random access procedure is one of a two-step random access procedure and a four-step random access procedure, the random access procedure is determined based on data volume of the small data, and the small data is sent by a terminal in a radio resource control (RRC) inactive state.

According to one embodiment of the present disclosure, a terminal is provided, and the terminal includes:

a processor;

a memory, configured to store executable instructions executable by the processor;

wherein the processor is configured to load and execute the executable instructions to implement any one of the aforementioned data transmission methods.

According to one embodiment of the present disclosure, a network device is provided, and the network device includes:

a processor;

a memory, configured to store executable instructions executable by the processor;

wherein the processor is configured to load and execute the executable instructions to implement any one of the aforementioned data transmission method.

According to one embodiment of the present disclosure, a computer-readable storage medium is provided, wherein instructions in the computer-readable storage medium, when executed by a processor, is capable of implementing the data transmission method described in the aforementioned embodiments.

In the embodiments of the present disclosure, when a terminal in a radio resource control (RRC) inactive state is to send small data, a random access procedure is determined from a two-step random access procedure and a four-step random access procedure based on data volume of the small data to send the small data, and by selecting a suitable random access procedure, small data transmission during the conversion of the terminal from the RRC_INACTIVE state to the RRC_CONNECTED state is realized without waiting for the completion of the state conversion before the small data transmission, making it possible to transmit the small data in a timely manner and reducing the time delay.

Those skilled in the art will easily think of other embodiments of the present disclosure after considering the description and practicing the present disclosure. The present disclosure is intended to cover any variant, use or adaptive change of the present disclosure. These variants, uses or adaptive changes follow the general principles of the present disclosure and include the common knowledge or commonly used technical means in the technical field not disclosed in the present disclosure. The description and the embodiments are only regarded as illustrative. The true scope and spirit of the present disclosure are indicated by the following claims.

It should be understood that the present disclosure is not limited to the precise structure described above and shown in the drawings, and various modifications and changes can be made without departing from the scope of the present disclosure. The scope of the present disclosure is limited only by the appended claims.

What is claimed is:

1. A data transmission method, comprising:

sending, by a terminal in a radio resource control (RRC) inactive state, small data via a random access procedure, wherein the random access procedure is one of a two-step random access procedure or a four-step random access procedure, and the random access procedure is determined based on data volume of the small data; wherein sending the small data via the random access procedure comprises:

in response to determining that a random access channel occasion (RO) configured by a network device comprises a first RO, sending the small data via the two-step random access procedure, wherein resource in a physical uplink shared channel occasion (PO) associated with the first RO is sufficient to carry the small data; and in response to determining that the data volume is greater than a data volume threshold, sending the small data via the four-step random access procedure.

2. The method according to claim 1, wherein sending the small data via the two-step random access procedure comprises:

sending the small data by using the PO associated with the first RO.

3. The method according to claim 1, wherein sending the small data via the random access procedure further comprises:

in response to determining that the RO configured by the network device does not comprise the first RO, sending the small data via the four-step random access procedure.

4. The method according to claim 3, wherein sending the small data via the four-step random access procedure comprises:

sending a first preamble, wherein the first preamble is used to indicate that the small data is to be sent via the four-step random access procedure;

receiving a random access response, wherein the random access response comprises indication information of resource for transmitting the small data, and the random access response is sent based on the first preamble; and sending the small data sent in a Msg3 by using the resource indicated by the indication information.

5. The method according to claim 1, wherein the data volume threshold is configured by a network device.

6. A data transmission method, comprising:

receiving, by a network device, small data sent via a random access procedure, wherein the random access procedure is one of a two-step random access procedure or a four-step random access procedure, the random access procedure is determined based on data volume of the small data, and the small data is sent by a terminal in a radio resource control (RRC) inactive state;

wherein receiving the small data sent via the random access procedure comprises:

receiving the small data sent via the two-step random access procedure, wherein a random access channel occasion (RO) configured by the network device comprises a first RO, and resource in a physical uplink shared channel occasion (PO) associated with the first RO is sufficient to carry the small data; and receiving the small data sent via the four-step random access procedure, wherein the data volume of the small data is greater than a data volume threshold.

7. The method according to claim 6, wherein receiving the small data sent via the two-step random access procedure comprises:

receiving the small data sent in the PO associated with the first RO via the two-step random access procedure, wherein the first RO is one of a plurality of ROs configured by the network device.

8. The method according to claim 6, wherein receiving the small data sent via the random access procedure further comprises:

receiving the small data sent via the four-step random access procedure, wherein resource in a PO associated with any RO configured by the network device is not sufficient to carry the small data.

9. The method according to claim 6, wherein receiving the small data sent via the four-step random access procedure comprises:

receiving a first preamble, wherein the first preamble is used to indicate that the small data is to be sent via the four-step random access procedure;

sending a random access response based on the first preamble, wherein the random access response comprises indication information of resource for transmitting the small data; and receiving the small data sent in a Msg3 by using the resource indicated by the indication information.

10. The method according to claim 6, wherein the data volume threshold is configured by the network device.

11. A terminal, comprising:

one or more processors;

a non-transitory storage coupled to the one or more processors; and a plurality of programs stored in the non-transitory storage that, when executed by the one or more processors, cause the terminal in a radio resource control (RRC) inactive state to perform acts comprising:

sending small data via a random access procedure, wherein the random access procedure is one of a two-step random access procedure or a four-step random access procedure, and the random access procedure is determined based on data volume of the small data; wherein sending the small data via the random access procedure comprises:

in response to determining that a random access channel occasion (RO) configured by a network device comprises a first RO, sending the small data via the two-step random access procedure, wherein resource in a physical uplink shared channel occasion (PO) associated with the first RO is sufficient to carry the small data; and in response to determining that the data volume is greater than a data volume threshold, sending the small data via the four-step random access procedure.

12. A network device, comprising:

one or more processors; and a non-transitory storage, configured to store executable instructions executable by the one or more processors;

wherein the one or more processors are configured to load and execute the executable instructions to implement the data transmission method of claim 6.

13. A non-transitory computer-readable storage medium, wherein instructions in the non-transitory computer-readable storage medium, when executed by a processor, implement the data transmission method of claim 1.

14. The method according to claim 1, wherein sending the small data via the four-step random access procedure comprises:

sending a first preamble, wherein the first preamble is used to indicate that the small data is to be sent via the four-step random access procedure;

receiving a random access response, wherein the random access response comprises indication information of resource for transmitting the small data, and the random access response is sent based on the first preamble; and sending the small data sent in a Msg3 by using the resource indicated by the indication information.

* * * * *